United States Patent
Takahiro

(10) Patent No.: US 8,480,356 B2
(45) Date of Patent: Jul. 9, 2013

(54) ADJUSTMENT MECHANISM IN VGS TYPE TURBOCHARGER AND EXHAUST GUIDE ASSEMBLY INCORPORATING THE SAME

(75) Inventor: Akita Takahiro, Shimada (JP)

(73) Assignee: Akita Fine Blanking Co., Ltd., Shizuoka (JP)

( * ) Notice: Subject to any disclaimer, the term of this patent is extended or adjusted under 35 U.S.C. 154(b) by 950 days.

(21) Appl. No.: 12/450,611

(22) PCT Filed: Jun. 5, 2008

(86) PCT No.: PCT/JP2008/060375
§ 371 (c)(1),
(2), (4) Date: Oct. 2, 2009

(87) PCT Pub. No.: WO2008/149938
PCT Pub. Date: Dec. 11, 2008

(65) Prior Publication Data
US 2010/0077748 A1    Apr. 1, 2010

(30) Foreign Application Priority Data
Jun. 7, 2007    (JP) ................................ 2007-151854

(51) Int. Cl.
*F01D 17/16* (2006.01)
(52) U.S. Cl.
USPC ............................................ 415/159; 60/614
(58) Field of Classification Search
USPC ................. 415/148, 151, 159, 160, 165, 166
See application file for complete search history.

(56) References Cited

U.S. PATENT DOCUMENTS

| 7,854,585 B2 * | 12/2010 | Petitjean ...................... 415/150 |
| 8,348,601 B2 * | 1/2013 | Hayashi et al. ............... 415/160 |
| 8,376,696 B2 * | 2/2013 | Suzuki et al. ................. 415/164 |
| 2005/0135059 A1 | 6/2005 | Araki et al. |

FOREIGN PATENT DOCUMENTS

| JP | 2005-183651 | 7/2005 |
| JP | 2006-90242 | 4/2006 |
| JP | 2007-111297 | 5/2007 |
| WO | 2007/046251 | 4/2007 |

OTHER PUBLICATIONS

International Search Report issued Aug. 5, 2008 in International (PCT) Application No. PCT/JP2008/060375.

* cited by examiner

*Primary Examiner* — Nathaniel Wiehe
*Assistant Examiner* — Justin Seabe
(74) *Attorney, Agent, or Firm* — Wenderoth, Lind & Ponack, L.L.P.

(57) ABSTRACT

A novel technique for partially improving wear resistance of an input portion of a drive ring, where power of a shifting drive is input from an external actuator, in an adjustment mechanism incorporated in a VGS type turbocharger for concurrently rotating adjustable blades, without specifically attaching a separate member afterwards is provided. The present invention is characterized in that the drive ring, to which shaft portions of the adjustable blades are connected, is made of a blank material punched out from a metal material having a substantially constant thickness, a blank being cut out such that the blank includes a surplus reinforcing portion in addition to an actual product part of the drive ring, the reinforcing portion being suitably folded back so as to partially increase the thickness of the input portion, where power of the shifting drive is input from the actuator, thereby increasing wear resistance of the input portion, and in addition characterized in that the material type/sheet thickness/shape factor are specified for implementation of the invention.

5 Claims, 11 Drawing Sheets

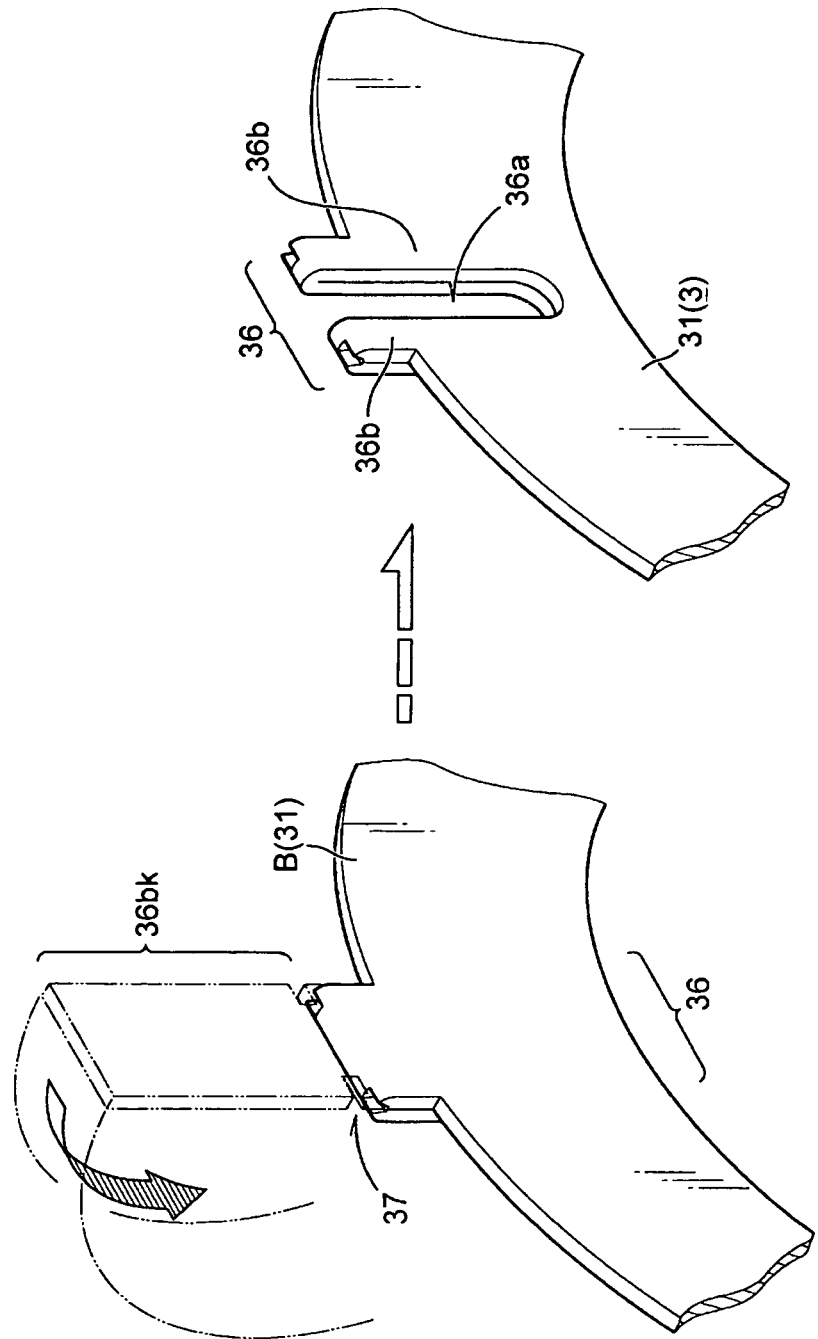

ADJUSTMENT MECHANISM IN VGS TYPE TURBOCHARGER AND EXHAUST GUIDE ASSEMBLY INCORPORATING THE SAME

TECHNICAL FIELD

The present invention relates to an adjustment mechanism that suitably rotates adjustable blades for adjusting the flow rate of exhaust gas fed to a turbine in a VGS (acronym standing for Variable Geometry System) type turbocharger for use in an automobile engine or the like, and more particularly to a novel adjustment mechanism with a drive ring for transmitting drive to the adjustable blades when rotating the same, wherein while the drive ring is made of a plate-like member with a constant thickness, an input portion thereof where power of a shifting drive is input from an actuator is formed by folding back part of the metal material, thereby securing sufficient wear resistance, and an exhaust guide assembly incorporating this mechanism.

BACKGROUND ART

A turbocharger is known as a supercharger used as a means for improving the power output and performance of an automobile engine. This turbocharger is an apparatus for bringing the engine into a supercharged state in which more air is supplied to the engine than its natural intake by rotating a compressor, using power output from a turbine that is driven by exhaust energy of the engine. When the engine is running at a low rotational speed, the exhaust turbine hardly works due to the reduced flow rate of exhaust gas, and therefore, with an engine capable of rotating in a high rotational speed range, this turbocharger inevitably involves a slow-moving feeling until the turbine starts rotating efficiently, as well as a so-called turbo-lag or time required afterwards until the turbine rapidly reaches its full-running state. Moreover, with a diesel engine that runs inherently at a low rotational speed, there is a drawback that the turbocharger effect can hardly be achieved.

Because of this, a VGS type turbocharger (VGS unit) that works efficiently even when the engine is running in a low rotational speed range has been developed. This turbocharger suitably throttles a low flow rate of exhaust with adjustable blades (vanes) to increase the velocity of the exhaust and to increase the work amount of the exhaust turbine, thereby enabling the engine to output high power even when the engine is running at a low rotational speed. Therefore the VGS unit requires an additional adjustment mechanism or the like for the adjustable blades, and also peripheral constituent components have to have a more complex shape or the like than conventional ones.

Under the circumstances, the assignee of the present application has undertaken rigorous research and development on VGS type turbochargers and has filed many patent applications (see, for example, Patent documents 1 to 8).

Meanwhile, an exhaust guide assembly of such a VGS type turbocharger is provided with an adjustment mechanism (drive ring) for concurrently and evenly opening and closing a plurality of circumferentially equally arranged adjustable blades. Namely, upon receipt of power of a shifting drive from an actuator provided outside, the adjustment mechanism including the drive ring first starts rotating, which eventually causes the plurality of adjustable blades to concurrently and evenly open and close (rotate).

Since the turbocharger is repeatedly used under extremely severe environments with high temperatures and exhaust gas, and since the adjustable blades control the flow rate of exhaust gas by their degree of opening, the adjustable blades during the operation are greatly subjected to the force of exhaust gas. Therefore, when rotating the adjustable blades, an excessive force is applied to the drive ring 31' that receives the power of the shifting drive from the actuator AC, in particular an input portion 36' where the power of the shifting drive is input, and, in combination with the above-mentioned environmental conditions, this portion is exposed to even more severe environments. Accordingly, the input portion 36' of the drive ring 31' sometimes suffers wear (wastage) after years of use in which the material of this portion is partly gouged out, or sheared off as is shown as one example in FIG. 14(a). Therefore a technique for improving (reinforcing) wear resistance of the input portion 36' has been desired.

To suppress such wear as much as possible, a technique of enhancing the entire wear resistance of the drive ring 31' by increasing its entire sheet thickness, or a technique of increasing the wear resistance by reviewing the material quality and changing the material itself used for the drive ring 31', or the like, may be considered.

However, the above-mentioned wear is not a phenomenon that occurs in the entire drive ring, but a phenomenon that occurs particularly in the input portion 36' that receives the power of the shifting drive from the actuator AC. Thus, the technique of increasing the entire sheet thickness of the drive ring 31' would be an attempt to reinforce the parts in addition to the input portion 36', which is unnecessary, as it were, and would lead to an increase in weight or cost and could not be adopted easily. At any rate, in the industry of automobile parts of this kind, cost reduction, weight reduction, and space reduction are constant requirements and therefore this technique of increasing the entire sheet thickness is contrary to these requirements, and thus not realistic.

On the other hand, the technique of changing the material itself used for the drive ring 31' to a material having a high wear resistance also involves a cost increase, and therefore is not an easily adoptable technique, under the circumstances of the automobile parts industry where cost reduction is a constant requirement.

The input portion 36' of the drive ring 31' often includes a slit-like drive opening 36a' for receiving a shift transmitting member on the actuator side. There has been an attempt in which, instead of punching out an opening, for example as shown in FIG. 14(b), part of the blank material B' is made to stand (bend) at about 90° relative to the actual product part, and is used for the reinforcement of the input portion 36'. However, since the drive opening 36a' of the input portion 36' has a limited (small) width S in the first place, standing up this part with such a dimension could not sufficiently increase the wear resistance of the input portion 36'.

In view of this, under the circumstances, a technique is adopted in which a separate member p for the reinforcement is attached to the input portion 36' of the drive ring 31' by welding or the like, for example as shown in FIG. 14(c), to partially improve the wear resistance of the input portion 36'. However, this technique requires an additional separate member p, and further, this separate member p needs to be joined by welding or the like (attached afterwards), and so the number of process steps in the production stage is inevitably increased. Thus, in the automobile industry where price competition is intense, a further improved technique that can replace this technique has been desired.

Patent document 1: Japanese Patent Application Laid-Open Publication No. 2003-49655

Patent document 2: Japanese Patent Application Laid-Open Publication No. 2003-49663

Patent document 3: Japanese Patent Application Laid-Open Publication No. 2003-49656
Patent document 4: Japanese Patent Application Laid-Open Publication No. 2003-49657
Patent document 5: Japanese Patent Application Laid-Open Publication No. 2003-49658
Patent document 6: Japanese Patent Application Laid-Open Publication No. 2003-49659
Patent document 7: Japanese Patent Application Laid-Open Publication No. 2003-48033
Patent document 8: Japanese Patent Application Laid-Open Publication No. 2003-49660

DISCLOSURE OF THE INVENTION

Problems to be Solved by the Invention

The present invention has been made in view of such a background and is intended for the development of a novel adjustment mechanism in which reinforcement of an input portion of a drive ring where power of a shifting drive is input from an external actuator is readily achieved without any particular separate member being required to be attached afterwards, and an exhaust guide assembly incorporating this adjustment mechanism.

Means for Solving the Problems

Namely, an adjustment mechanism in a VGS type turbocharger according to claim 1 is an adjustment mechanism incorporated in an exhaust guide assembly of a VGS type turbocharger, wherein a plurality of adjustable blades disposed at the outside of an outer circumference of an exhaust turbine wheel are rotated, and a relatively small amount of exhaust gas discharged from an engine is suitably throttled by the adjustable blades to increase the velocity of the exhaust gas, so as to rotate the exhaust turbine wheel using energy of the exhaust gas and to feed more air than natural intake into the engine by a compressor directly connected to the exhaust turbine wheel, thereby enabling the engine to output high power even when the engine is rotating at a low rotational speed, the adjustment mechanism being characterized in that: when concurrently rotating the plurality of adjustable blades by the adjustment mechanism, an actuator provided outside is shift-driven to rotate a drive ring to which shaft portions of the adjustable blades are connected, thereby collectively rotating the plurality of adjustable blades; and that the drive ring is formed of a blank material punched out from a metal material having a substantially constant sheet thickness, a blank being cut out such that the blank includes a surplus reinforcing portion in addition to an actual product part of the drive ring, the reinforcing portion being suitably folded back so as to partially increase the thickness of an input portion of the drive ring, where power of the shifting drive is input from the actuator, thereby increasing wear resistance of the input portion.

The adjustment mechanism in a VGS type turbocharger according to claim 2 is characterized in that, in addition to the features as set forth in claim 1, the blank material of the drive ring is formed with a notch that helps the folding back of the reinforcing portion at the same time that the cutting out of the blank is performed.

The adjustment mechanism in a VGS type turbocharger according to claim 3 is characterized in that, in addition to the features as set forth in claim 1 or 2, when forming the reinforcing portion in the blank material, the reinforcing portion is formed to extend along a radial line connecting a center of the drive ring and the input portion.

The adjustment mechanism in a VGS type turbocharger according to claim 4 is characterized in that, in addition to the features as set forth in claim 1, 2 or 3, for the blank material of the drive ring, a heat resistant austenite steel having an austenite potential of 28 or more and an ASTM crystal grain size number of 6.0 to 8.0 is applied, and that the input portion is designed to have a b/t value of 3.0 or more, where b represents a width and t represents a sheet thickness of the input portion.

Here, ASTM is an abbreviation of "American Society for Testing and Materials."

An exhaust guide assembly of a VGS type turbocharger according to claim 5 is an exhaust guide assembly of a VGS type turbocharger wherein a plurality of adjustable blades are rotatably provided at the outside of an outer circumference of an exhaust turbine wheel, and a relatively small amount of exhaust discharged from an engine is suitably throttled by the adjustable blades to increase the velocity of the exhaust gas, so as to rotate the exhaust turbine wheel using energy of the exhaust gas and to feed more air than natural intake into the engine by a compressor directly connected to the exhaust turbine wheel, thereby enabling the engine to output high power even when the engine is rotating at a low rotational speed, characterized in that the exhaust guide assembly is constituted by incorporating the adjustment mechanism as set forth in any one of claims 1 to 4.

EFFECTS OF THE INVENTION

The configurations of the invention as set forth in each of these claims will provide means for solving the problems mentioned in the foregoing.

Namely, according to the invention as set forth in claim 1, while the drive ring for concurrently rotating the adjustable blades is formed from a metal material having a substantially constant sheet thickness, by folding back part of the sheet material, wear resistance of the input portion where power of the shifting drive is input from the external actuator can be partially increased. Accordingly, the wear resistance of the input portion can be increased without attaching any separate member afterwards to the input portion of the drive ring. Since there is no need to attach a separate member afterwards, production is performed efficiently, whereby cost reduction, weight reduction, space reduction and the like, can be achieved.

Also according to the present invention, since the wear resistance of the input portion can be locally increased even though the drive ring is formed from a sheet-like member, the quality of the material itself that has conventionally been used for the drive ring may be fundamentally reviewed; and depending on the case, use of a cheaper material having a lower heat resistance than the conventional one may be considered, which will open up the possibility of a further cost reduction.

According to the invention as set forth in claim 2, since a notch that helps the folding back of the reinforcing portion is formed in the blank material, the folding back of the reinforcing portion is reliably carried out, and a desired input portion can be formed reliably. Moreover, as the formation of such a notch can be performed at the same time that the cutting out of the material or the blank is performed, manufacturability (mass-production capability) of the drive ring is further enhanced. It should be noted that, since the exhaust guide assembly includes various numerous parts assembled in a confined space, the formation of the input portion by folding back part of the sheet member, which is ensured by the notch, will also contribute to prevention of contact between various parts.

According to the invention as set forth in claim 3, since part of the blank material on the ring center side (inner side of the ring) is folded back to form the reinforcing portion, a hole portion inside the ring that is usually discarded after the cutting out of the blank can be efficiently utilized as a reinforcing portion, whereby thorough use of material and cost reduction can be further promoted. The configuration in which the reinforcing portion (non-product part) is formed to extend along the radial direction connecting a ring center and the input portion makes it relatively easy to adopt a structure for further increasing the sheet thickness of the input portion in which the reinforcing portions formed on the ring center side and the ring outer side are alternately folded back.

According to the invention as set forth in claim 4, preferable material type/material quality/shape factor for the blank material are specified based primarily on plane-strain bending deformation theories, so that the bending for folding back the reinforcing portion can be performed even more precisely. The present invention in which the material type/material quality/shape factor for the blank material are selected based on these theories not only enables economic production of the drive ring but can also contribute to improvement of the productivity of the exhaust guide assembly.

According to the invention as set forth in claim 5, while the drive ring for rotating the adjustable blades is formed from a metal material having a substantially constant sheet thickness, by folding back part of the sheet material, wear resistance of the input portion where power of the shifting drive is input from the external actuator can be partially increased. Accordingly, there is no need to specifically provide any separate member to the input portion of the drive ring, and manufacture of the drive ring, and also production of the exhaust guide assembly, can be performed efficiently, whereby cost reduction, weight reduction, space reduction and the like can be achieved.

Also according to the present invention, since the input portion can be partially reinforced even though the drive ring is formed from a sheet-like member, the quality of the material itself that has conventionally been used for the drive ring may be fundamentally reviewed; and depending on the case, use of a cheaper material having a lower heat resistance than the conventional one may be considered, which will open up the possibility of a further cost reduction.

BRIEF DESCRIPTION OF THE DRAWINGS

FIG. 2 is a perspective view showing another technique of reinforcing the input portion of the drive ring, in which a drive opening of the input portion is formed after folding back a reinforcing portion;

DESCRIPTION OF REFERENCE NUMERALS AND CHARACTERS

Figure 1:
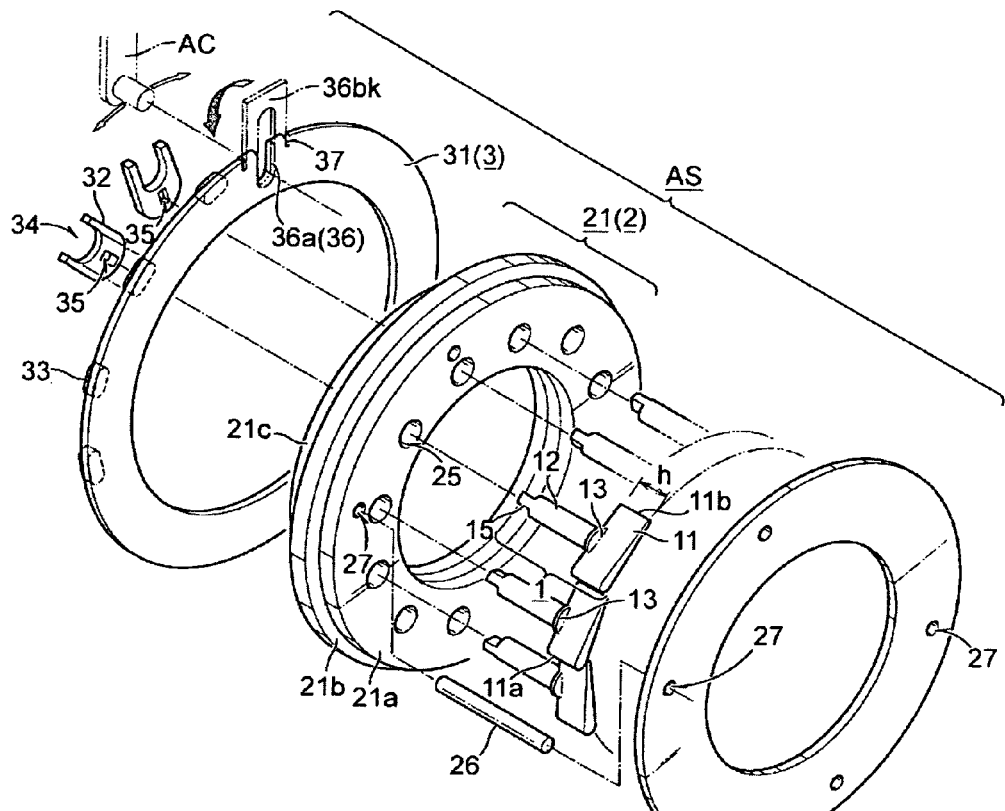
FIG. 1 is an exploded perspective view showing one example of an exhaust guide assembly incorporating an adjustment mechanism of the present invention, FIG. 1(a) being a perspective view showing one example of a VGS type turbocharger, and FIG. 1(b) being an enlarged perspective view showing how an input portion of a drive ring is reinforced by folding back part of a blank material.

1 Adjustable blade
1A Adjustable blade (double shaft type)
2 Turbine frame
3 Adjustment mechanism
11 Blade portion
11a Leading edge
11b Trailing edge
12 Shaft portion
12a Long shaft portion
12b Short shaft portion
13 Flange portion
15 Reference surface
21 Frame segment
21a Frame element
21b Frame element
21c Frame element
21n Frame element (representative one)
22 Retaining member
25 Bearing portion
25a Bearing portion (long shaft portion side)
25b Bearing portion (short shaft portion side)
26 Swage pin
27 Pin hole
31 Drive ring
32 Transmitter
33 Drive portion
34 Driven portion
35 Insertion hole
36 Input portion 36a Drive opening
36b Side portion
36c Connecting portion
36bk Reinforcing portion
37 Notch
AC Actuator
AS Exhaust guide assembly
B Blank material (of the drive ring)
G Exhaust gas
h Blade width
p Separate member
L Chord length
S Width
T Exhaust turbine wheel

BEST MODE FOR CARRYING OUT THE INVENTION

Best modes for carrying out the present invention include the embodiment described below as one, as well as various other techniques that can be improved within the technical scope of the invention.

In the following description, an exhaust guide assembly AS in a VGS type turbocharger incorporating an adjustment mechanism 3 of the present invention will be schematically described, in the course of which the adjustment mechanism 3 will also be described.

Embodiments

Figure 1B:
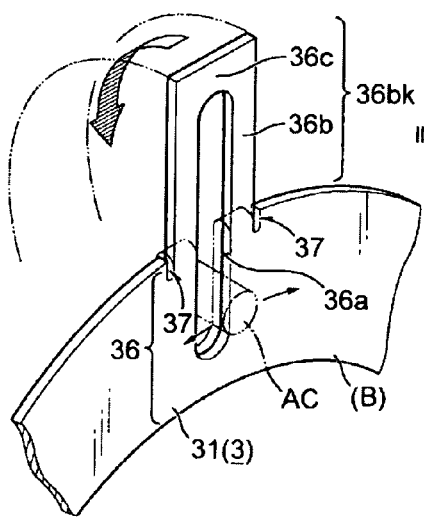
Figure 1A:
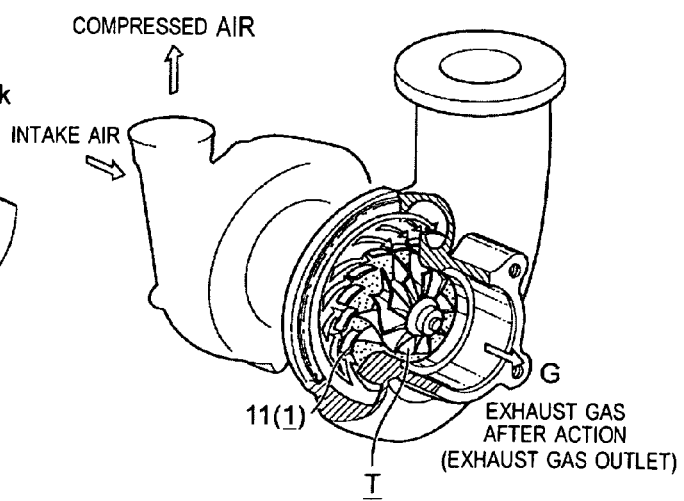

The exhaust guide assembly AS adjusts the flow rate of exhaust by suitably throttling exhaust gas G, particularly when the engine is running at a low rotational speed, and is made up of, as shown in FIGS. 1 and 1(a) as one example, a plurality of adjustable blades 1 provided at the outside of an outer circumference of an exhaust turbine wheel T to substantially determine the flow rate of exhaust, a turbine frame 2 rotatably retaining the adjustable blades 1, and an adjustment mechanism 3 for rotating the adjustable blades 1 by a predetermined angle for suitably determining the flow rate of the exhaust gas G. Hereinafter, each of the constituent parts will be described.

First, the adjustable blades 1 will be described. As shown in FIGS. 1 and 1(b) as one example, a plurality (about ten to fifteen per one exhaust guide assembly AS) of these adjustable blades are arranged along the outer circumference of the exhaust turbine wheel T in an arc shape, each of which rotates generally evenly and concurrently to adjust the flow rate of exhaust. Each adjustable blade 1 is formed by a blade portion 11 and a shaft portion 12, which will be described below.

First, the blade portion 11 is basically formed to have a constant width in accordance with the width of the exhaust turbine wheel T, and is configured such that a cross section thereof in its width direction is formed in an airfoil shape so as to effectively cause the exhaust gas G to proceed towards the exhaust turbine wheel T. Here, as indicated also in FIG. 1, the width of the blade portion 11 is referred to as a blade width h for convenience of explanation. Also as shown in the drawings, reference numerals 11a, 11b, and L are respectively given to a leading edge at one end where the blade portion 11 is thicker in the airfoil-shaped cross section, a trailing edge at one end where the blade portion is thinner, and a chord length that is a length from the leading edge 11a to the trailing edge 11b (see FIG. 4(a)).

Furthermore, the blade portion 11 is formed with a flange portion 13 having a somewhat larger diameter than that of the shaft portion 12 at an interface portion (connecting portion) between itself and the shaft portion 12. The flange portion 13 has a bottom face (bearing surface) that is formed to be substantially coplanar with an end face of the blade portion 11, this flat surface forming a bearing surface when the adjustable blades 1 are inserted into the turbine frame 2, and having a function of restricting the position in the width direction (direction of blade width h) in the exhaust turbine wheel T.

Meanwhile, the shaft portion 12 is continuously and integrally formed with the blade portion 11, constituting a rotation axis when moving the blade portion 11. At the tip of this shaft portion 12 is formed a reference surface 15 that provides a reference for an attached state of the adjustable blade 1. This reference surface 15 is a portion fixed to the adjustment mechanism 3 to be described later by swaging or the like, and as shown in FIG. 1 as one example, it is formed as two flat surfaces obtained by cutting off opposing parts of the shaft portion 12.

The adjustable blade 1 shown in FIG. 1 is a so-called cantilevered-type adjustable blade 1 that has the shaft portion 12 only on one side of the blade portion 11. However, as the adjustable blade 1, a so-called double shaft type or center blade type that has shaft portions 12 on both sides of the blade portion 11 as shown for example in FIG. 4(b) can also be applied. Hereinafter, if referred to simply as "adjustable blade 1", it shall collectively mean both of these types, and when they need particularly to be differentiated from each other, they will be done so by giving a reference numeral "1A" to the double shaft type adjustable blade. This adjustable blade 1A will be described below.

Figure 4A:
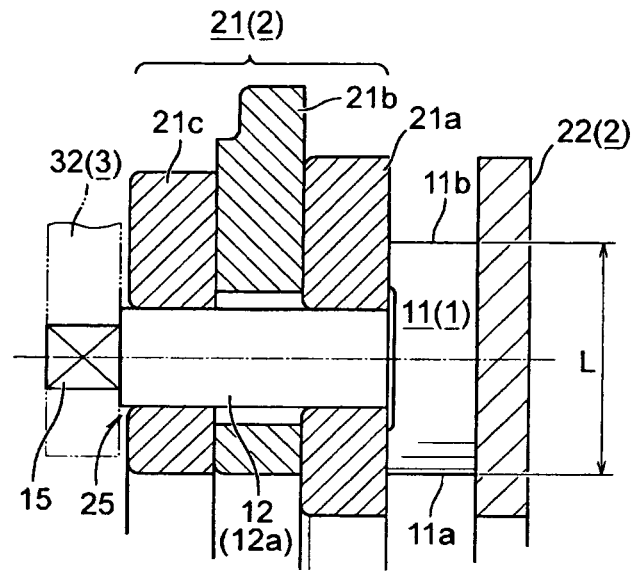
FIG. 4(a) is an enlarged view of major parts illustrating the vicinity of a bearing portion when the adjustable blades are of a cantilevered type.
Figure 4B:
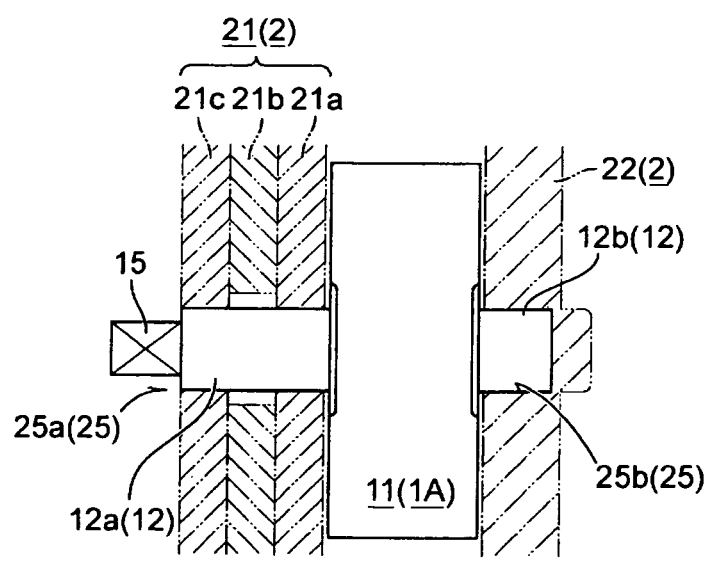
FIG. 4(b) is an enlarged view of major parts illustrating the vicinity of a bearing portion when the adjustable blades are of a double shaft type.

The double shaft type adjustable blade 1A is basically formed in the same manner as the cantilevered adjustable blade 1, a large difference being that it has shaft portions 12 on both sides of the blade portion 11 as noted above. Here, when both shaft portions 12 need to be differentiated from each other and illustrated, as shown in FIG. 4(b) as one example, based on their shaft lengths, for the sake of convenience, they will be referred to as a long shaft portion 12a and a short shaft portion 12b to make a distinction. Incidentally, such a double shaft type adjustable blade 1A is effective in improving operation stability (rotation stability) and strength or the like of the adjustable blade 1A as compared to the cantilevered type.

Next, the turbine frame 2 will be described. This is configured as a frame member for rotatably retaining the plurality of adjustable blades 1, and as shown in FIG. 1 and FIG. 4(a) or 4(b) as one example, it is configured such as to hold the adjustable blades 1 (blade portions 11) between a frame segment 21 and a retaining member 22.

The frame segment 21 is formed such that its central part is open, with bearing portions 25 equally spaced around in its peripheral part for receiving the shaft portions 12 (long shaft portions 12a) of the adjustable blades 1. To an outer circumferential part of this frame segment 21 is provided the adjustment mechanism 3 to be described later.

The retaining member 22 is, as shown in FIG. 1 as one example, formed in a disc shape with its central part being open.

In a case where the adjustable blade 1 is of a double shaft type, as shown in FIG. 4(b), bearing portions 25 are equally spaced around in the retaining member 22, too, so that the short shaft portions 12b of the adjustable blades 1 are rotatably inserted therein. Here, when the bearing portions 25 need to be differentiated from each other and illustrated, the bearing portions retaining the long shaft portions 12a will be designated by 25a, while the bearing portions retaining the short shaft portions 12b will be designated by 25b. Here, while the bearing portions 25a are formed as through holes, the bearing portions 25b are formed as non-through holes. This structure is effective in preventing leakage of exhaust gas G through the bearing portions 25b without particularly using another component. Conversely, if the bearing portions 25b are formed as through holes similarly to the bearing portions 25a, then it is preferable to provide a component that plugs the bearing portions 25b from the opposite side of the adjustable blades 1 (for example a ring-like component).

In order that the adjustable blades 1 held between the frame segment 21 and retaining member 22 can always smoothly rotate, the dimension between these members is maintained substantially constant (generally equal to the blade width h of the adjustable blades 1). For example, the dimension between these members 21 and 22 is maintained by swage pins 26 provided at four locations in an outer circumferential part of the bearing portions 25. Here, holes formed in the frame segment 21 and the retaining member 22 to receive these swage pins 26 are referred to as pin holes 27.

Here, the frame segment 21 is formed by combining a plurality of components, each of these elements being termed "frame elements", and are given reference numerals 21a, 21b, 21c, 21d, and so forth sequentially from the side of the blade portion 11 (exhaust turbine wheel T), (with the representative numeral being 21n). These elements can be assembled by fastening (joining) them to each other by swaging, pin press fitting, brazing or the like.

The reason why the frame segment 21 is formed of separate elements is to make it easy to form a step in the bearing portions 25a. Namely, for example in the case of FIG. 4(a) or 4(b), the frame elements 21a and 21c are preliminarily provided with holes (bearing portions 25a) of substantially the same size as that of the shaft portions 12 (long shaft portions 12a), while the frame element 21b is provided with holes (bearing portions 25a) larger than the shaft portion 12, so that, when the elements 21a, 21c and element 21b are united with each other, the long shaft portions 12a and bearing portions 25a come into partial contact, whereby a structure that will suppress sliding resistance of the adjustable blades 1 as much as possible can be readily provided. Thus, with respect to the bearing portions 25b retaining the short shaft portions 12b, too, a step can be formed to suppress sliding resistance. Of course, a step may be formed with respect to the shaft portions 12 while the bearing portions 25 are formed straight, to realize the partial contact made between the shaft portions 12 and the bearing portions, i.e., the bearing structure that suppresses sliding resistance of the adjustable blades 1.

Next, the adjustment mechanism 3 of the present invention will be described. The adjustment mechanism 3 suitably rotates the adjustable blades 1 so as to adjust the flow rate of exhaust. As shown in FIG. 1 as one example, the main constituent components of the mechanism 3 are a drive ring 31 for bringing about rotation of the adjustable blades 1 inside the exhaust guide assembly AS, and transmitters 32 for transmitting this rotation to the adjustable blades 1.

The drive ring 31 includes elongated protrusions such as those illustrated (these being drive portions 33), and each transmitter 32 includes a U-shaped driven portion 34. The protruded drive portion 33 is received inside this U-shaped driven portion 34 so as to transmit rotation from the drive ring 31 to the transmitter 32. Namely, an outer side of the protruded drive portion 33 and an inner side of the U-shaped driven portion 34 make rotating sliding contact (engagement) with each other to transmit rotation of the drive ring 31 to the transmitter 32.

Each transmitter 32 is formed with an insertion hole 35 for receiving the reference surface 15 (shaft portion 12) of each adjustable blade 1, so that the adjustable blades 1 are fastened (joined) to the transmitters 32 by swaging or the like after the shaft portions 12 are fitted into these insertion holes 35 at a predetermined angle. Thus, when the transmitters 32 are turned a certain angle upon receiving a drive (rotation) from the drive ring 31, the adjustable blades 1 also rotate the predetermined angle.

The above drive ring 31 is shift-driven by the actuator AC provided outside the exhaust guide assembly AS. A slit-like opening formed in a peripheral edge portion of the drive ring 31 forms an input portion 36 for receiving power of the shifting drive from the actuator AC.

Here, the input portion 36 generally represents the part where the power of the shifting drive is input from the actuator AC as shown in FIG. 1(b), while the slit-like opening for receiving a shift transmitting member (such as a pin-like member or a link member) on the side of the actuator AC is referred to as a drive opening 36a. Both sides of the drive opening 36a, namely the parts that substantially require reinforcement because the shift transmitting member on the side of the actuator AC makes direct contact therewith, are referred to as side portions 36b.

Since the input portion 36 is formed by folding back part of a blank material B, when cutting out a blank, it is done such that the blank also has a surplus reinforcing portion 36bk which will be a non-product part, in addition to the actual product part that generally has a front projection shape of a complete drive ring 31 (see FIG. 1(b)). This reinforcing portion 36bk is then folded more than once so as to overlap the input portion 36 that is the actual product part, in order to improve the wear resistance of the input portion 36 in a complete state. Reference numeral 36c in the drawing denotes a connecting portion formed to connect the side portions 36b of the reinforcing portion 36bk of the blank material B (on the distal end of the drive opening 36a).

Further, the blank material B is formed with notches 37 that help the folding back of the reinforcing portion 36bk, so that the reinforcing portion 36bk can be reliably and smoothly folded back to realize a desired input portion 36. In particular, formation of such notches 37 may be performed at the same time as the cutting out of the material or blanks, which is economic because manufacturability (mass-production capability) of the drive ring 31 can be further improved.

The notches 37 may be formed for example in the width direction of the input portion 36, i.e., along outer edges of the side portions 36b, as shown in FIG. 1(b) (these will be referred to as "radial notches 37" since they are formed along the radial direction of the ring), or, as shown in FIG. 2, they may be formed substantially orthogonal to the drive opening 36a (which will be referred to as "circumferential notches 37").

It should be noted that, the radial notches 37 such as those shown in FIGS. 1 and 1(b) are preferable for a folding back process in a case in which the input portion 36 must not protrude to the outside of the ring (ring outer line), because they allow the reinforcing portion 36bk to be folded back so as not to protrude from the outside diameter (outer circle) of the drive ring 31 (to be folded back to achieve a "flush" surface).

On the other hand, the circumferential notches 37 such as those shown in FIG. 2 may be regarded as suitable for a folding back process in a case in which the reinforcing portion 36bk may protrude to the outside of the ring. The notches 37 in this case should preferably be formed at both ends of a bending line (at outermost positions of the folded-back portion). This is because, during the bending, shape defects such as cracks or saddle-like warpage can sometimes occur on the bending line, and the above notches 37 can prevent these defects, whereby the folding back can be carried out more reliably as desired (see FIGS. 9(a) and 9(b)). Of course, when forming such circumferential notches 37 in the blank material B (drive ring 31), the notch length should be determined so as to secure sufficient connection strength of the reinforcing portion 36bk, taking into account that the drive opening 36a is formed in the center of the input portion 36.

It should be noted that, while in the embodiments shown here, these two types of notches 37 are separately formed in respective blank materials B (drive ring 31), these two types of notches 37 may be formed in one blank material B at the same time, depending on the material or sheet thickness of the drive ring 31, or on the width of the input portion 36 (width of the folded-back portion).

Further, while the above notches 37 shown in FIGS. 1 and 1(b) or FIG. 2 have an elongated shape, other suitable shapes such as a triangle, rectangle, circle, slit (linear), and the like can be adopted.

It should be noted that, "a notch that helps the folding back of the reinforcing portion" set forth in claims is a description of these two types of notches 37 taking into account the effects and advantages described above.

The exhaust guide assembly AS, with these adjustable blades 1, turbine frame 2, and adjustment mechanism 3 described above, suitably rotates the drive ring 31 with the shifting drive from the actuator AC when the engine rotates at a low rotational speed, and this rotation is transmitted to the shaft portions 12 through the transmitters 32 to eventually rotate the adjustable blades 1. This operation causes the exhaust gas G to be suitably throttled as shown in FIG. 1(a), whereby the flow rate thereof is adjusted.

In an initial state in which the plurality of adjustable blades 1 are mounted, in order to align these circumferentially, it is necessary to mount each of the adjustable blades 1 and transmitters 32 at a substantially constant angle. In this embodiment, the reference surfaces 15 of the adjustable blades 1 basically have this function.

The exhaust guide assembly AS has a basic structure as described above. Below, various embodiments (modification examples) of the drive ring 31 will be described.

Namely, the above drive ring 31 shown in FIGS. 1 and 1(b) is illustrated as being formed with the drive opening 36a beforehand in the blank material B (reinforcing portion 36bk) to form the input portion 36, the reinforcing portion 36bk being folded back to form the input portion 36. However, to form the input portion 36, the drive opening 36a need not necessarily be formed beforehand. For example as shown in FIG. 2, the drive opening 36a may be formed, after folding back the reinforcing portion 36bk that is not formed (that has no opening) with the drive opening 36a, by punching out two sheets of the material (blank material B) at the same time.

Figure 3:
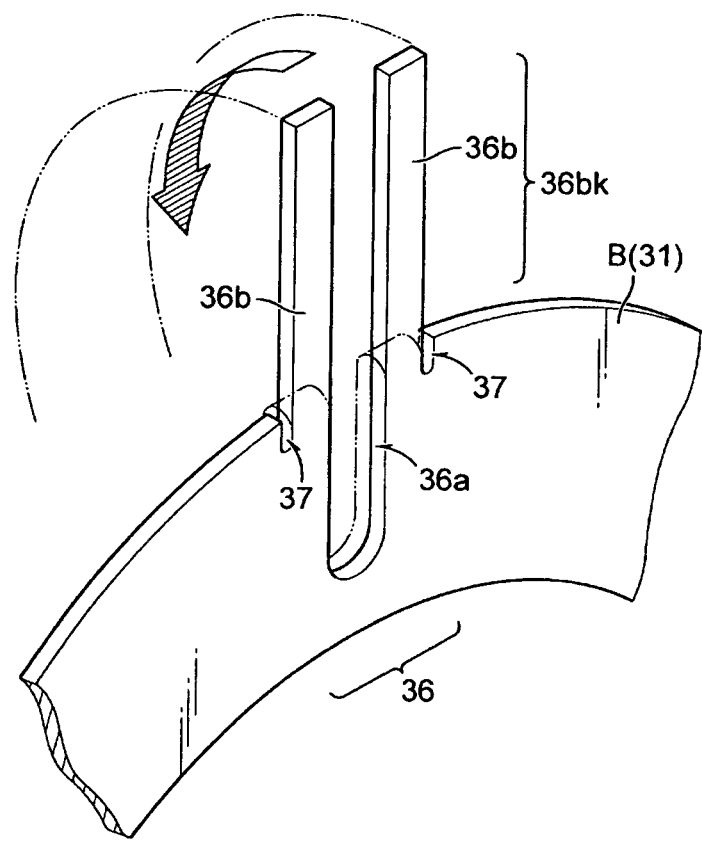
FIG. 3 is a perspective view showing a reinforcing portion that has a disconnected distal end (that has no connecting portion) of the drive opening with its side portions being formed separately.

Also, while the above reinforcing portion 36bk shown in FIGS. 1 and 1(b) is formed such that the side portions 36b are connected to each other by the connecting portion 36c, for example as shown in FIG. 3, the reinforcing portion 36bk may have a separate shape without the distal ends of the drive opening 36a being connected to each other (without providing the connecting portion 36c).

In all of the above embodiments shown in FIG. 1 to FIG. 3, the reinforcing portion 36bk is folded back only once so as to form an input portion 36 that has in total a thickness of two sheets. However, an input portion 36 having a sheet thickness of three sheets or more can also be formed by variously designing the blank shape. Below, these embodiments (modification examples) will be described.

Figure 5B:
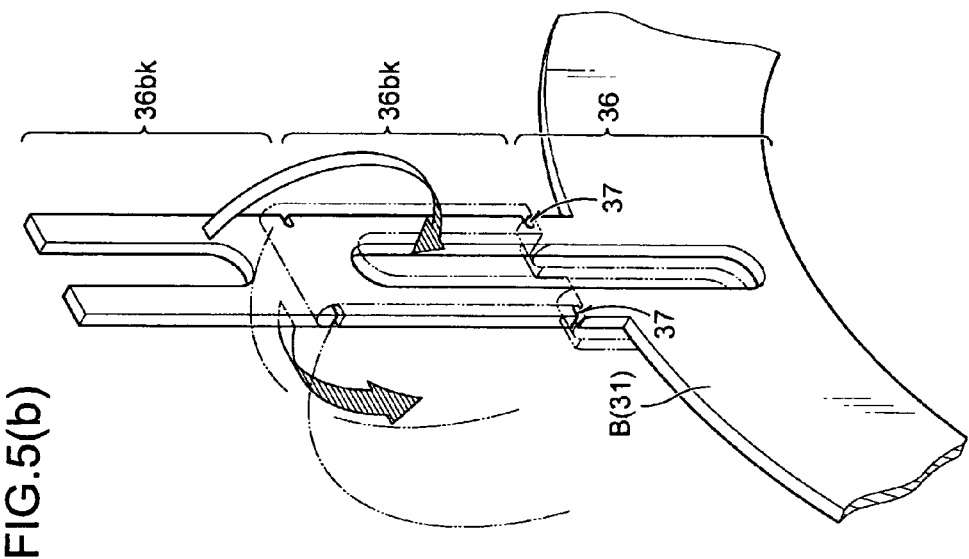
FIGS. 5(a) and 5(b) are perspective views showing two types of folding back techniques for forming the input portion of the drive ring to have a thickness of three sheets.
Figure 5A:
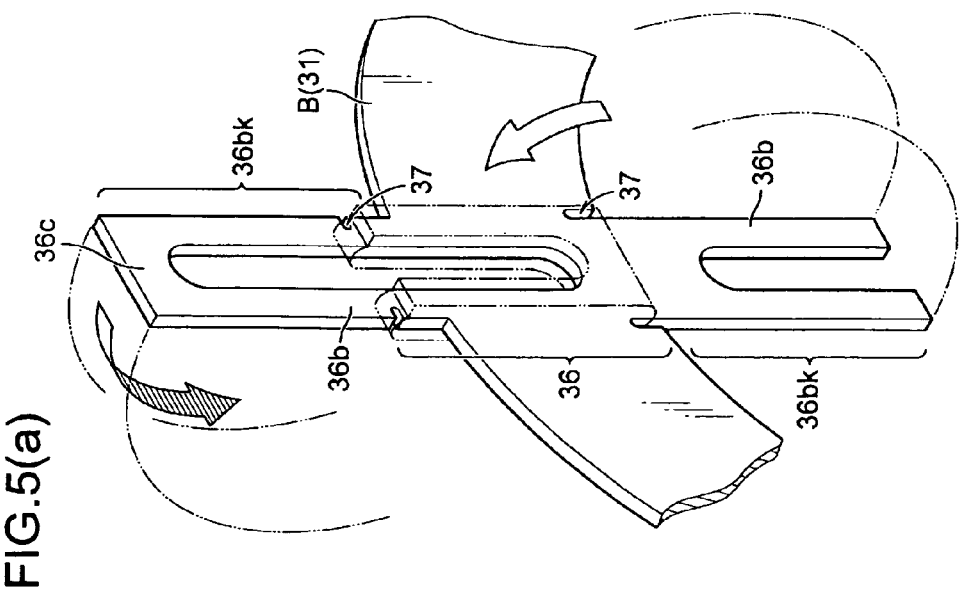

FIG. 5(a) shows an embodiment in which reinforcing portions 36bk are separately formed on the inner circumferential side and outer circumferential side of the input portion 36 (ring center side and ring outer side), which reinforcing portions 36bk are then folded back in opposite directions onto the input portion 36 that is the actual product part, thereby eventually forming an input portion 36 having a thickness of three sheets of blank material B. In this case, the input portion formed with such a thickness of three sheets has a wear resistance three times higher than that of the input portion 36 formed with a single sheet.

This technique of increasing the sheet thickness of the input portion 36 by folding back reinforcing portions 36bk preliminarily formed on the inner and outer circumferential sides of the input portion 36 in mutually different directions increases the sheet thickness of the blank material B evenly on both sides thereof by the folded-back portions, and therefore is suitable in a case in which contact of the reinforcing portion with other parts must be avoided (in which it is not preferable to increase the sheet thickness only on one side).

FIG. 5(b) shows an embodiment in which two sheets of reinforcing portions 36bk are continuously formed on the outer circumferential side of the input portion 36 (ring outer side), which reinforcing portions 36bk are then folded back alternately to the front side and to the back side, thereby eventually forming an input portion 36 having a thickness of three sheets.

FIGS. 5(a) and 5(b) illustrate examples in which the reinforcing portions 36bk are formed to extend along a line in the radial direction (along a straight line) connecting the center of the drive ring 31 and the input portion 36, and this design, with these reinforcing portions 36bk formed on the ring center side and ring outer side being alternately folded back, makes it easy to adopt a structure for increasing the sheet thickness of the finished input portion 36 even more (Theoretically, it is considered easy to form an input portion 36 having a thickness of four sheets or more).

Moreover, in the above example shown in FIG. 5(a), the reinforcing portion 36bk is formed on the ring center side which is, usually, discarded in most cases after cutting out blanks, and so the material being used can be thoroughly used, which will lead to a further reduction in cost.

Figure 6A:
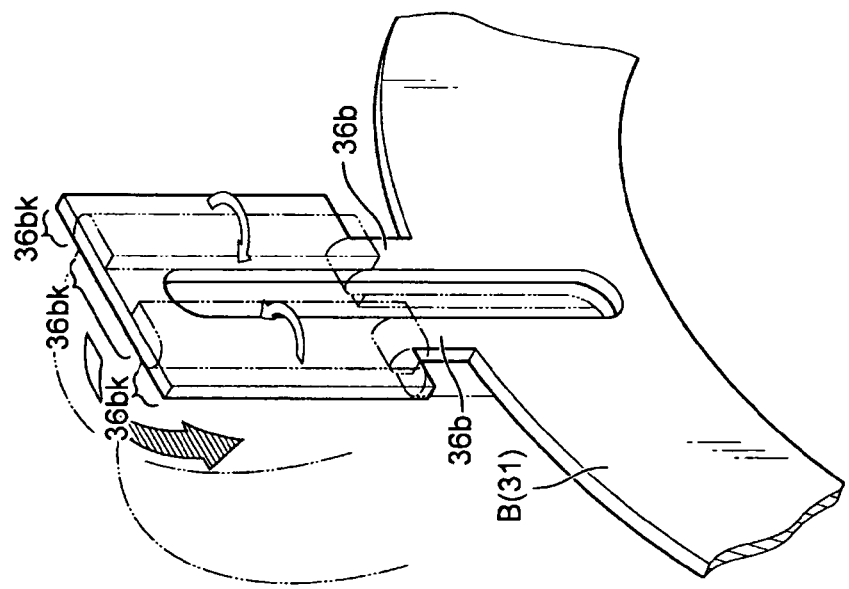
FIGS. 6(a) and 6(b) are perspective views showing another two types of folding back techniques for forming the input portion of the drive ring to have a thickness of three sheets.

Further, FIG. 6(a) shows an embodiment in which one sheet of reinforcing portion 36bk is formed on the outer circumferential side of the input portion 36 (ring outer side), and an additional sheet of reinforcing portion 36bk is formed on one side thereof. In this case, too, although the folding direction is different from those in the above embodiments, the side-part reinforcing portion 36bk and the reinforcing portion 36bk formed in an extending manner on the outer circumferential side of the ring are alternately folded back, whereby an input portion 36 having a thickness of three sheets can eventually be formed.

Figure 6B:
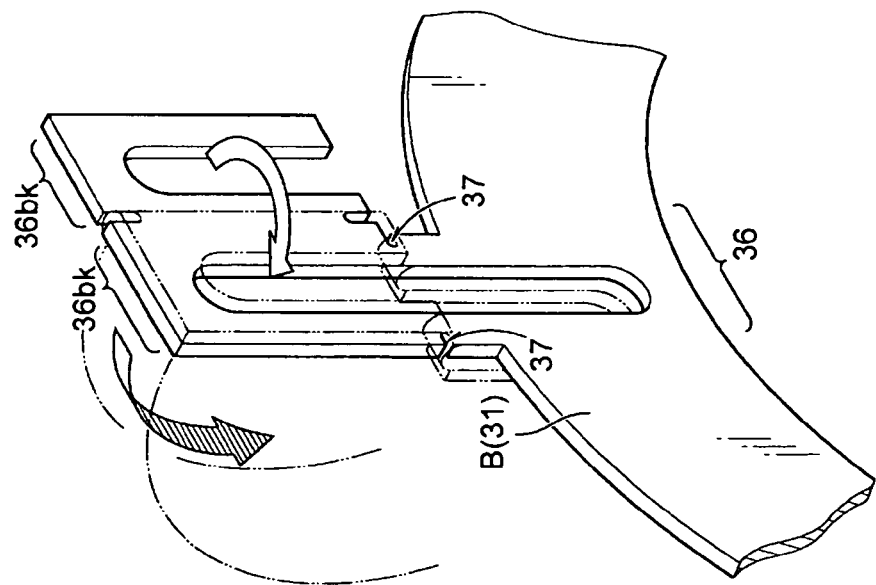

FIG. 6(b) shows an example in which one sheet of reinforcing portion 36bk is formed to extend on the outer circumferential side of the input portion 36 (ring outer side), and other reinforcing portions 36bk having substantially the same short width as that of the side portions 36b are formed on both sides thereof. In this case, too, the short-width reinforcing portions 36bk on both sides and the reinforcing portion 36bk formed in an extending manner are folded back in different directions, whereby an input portion 36 having a thickness of three sheets can eventually be formed.

Next, the manufacturing process (production process) of such a drive ring 31 will be schematically described. The final shape or the like of the drive ring 31 described here is that specified above and shown in FIGS. 1 and 1(b). Namely, the input portion 36 in a complete state has a thickness of two sheets of blank material B, and the folding back of the reinforcing portion 36*bk* is performed after forming (providing an opening) the drive opening 36*a*.

(1) Punching Out the Blank Material (Punching Out the Drive Ring Shape)

The blank material B is punched out from a metal material having a substantially constant sheet thickness to form the drive ring 31. For the metal material used here, SUH660 having a high heat resistance is commonly used. Considering, however, the advantages of the present invention that the wear resistance of the input portion 36 can be partially improved by the folding back, SUS310S, which has a lower heat resistance than SUH660 but is inexpensive, may be used as the metal material in the future.

When punching out the above blank material B, the reinforcing portion 36*bk*, which is a part that is surplus (non-product part) to the actual product parts, is punched out at the same time as the actual product parts such as the inner shape or outer shape of the drive ring 31 are punched out. It is also possible to collectively punch out the drive opening 36*a*, notches 37 and the like when cutting out the blanks, whereby the productivity (mass-production capability) of the drive ring 31 can be further improved.

(2) Folding Back the Reinforcing Portion (Reinforcing the Input Portion)

Next, the reinforcing portion 36*bk* of the blank material B thus punched out is folded back to overlap the input portion 36 that is an actual product part to increase the thickness of the input portion 36 in a complete state and to increase the wear resistance of the input portion 36. Because the notches 37 have been formed in the blank material B to guide the folding back of the reinforcing portion 36*bk*, the folding back is readily performed and reliably achieved.

The drive portions 33 can be formed by a cutting process performed at a suitable stage, but they can also be formed at the same time as the punching out of the drive ring 31 (cutting out of the blanks). In particular, while the drive portions 33 in FIG. 1 are formed to protrude from one surface of the drive ring 31, since the primary purpose of the drive portions 33 is to make rotating sliding contact with the transmitters 32 to transmit the rotation (drive), if each transmitter (contact portion) 32 is formed for example in the form of a link, then the drive portion 33 can be formed as a notch that receives this link. In such a case in particular, such notch-like drive portions 33 can be formed (opened) at the same time as the punching out of the drive ring 31 is done.

As described above, the present invention improves the wear resistance of the input portion 36, particularly the drive opening 36*a* with which the shift transmitting member on the side of the actuator AC makes direct contact, by folding back the reinforcing portion 36*bk* of the material (blank material B), the object and significance thereof being as described above. Here, heat resistant austenite steel is commonly used for the drive ring 31, and since it has been found that, for the industrial implementation of the above folding back operation, it is preferable to give consideration to bending/deformation theories in material mechanics and to carry out technical methods and take measures taking account of the material type/material quality/shape factor based on the theories, which will be hereinafter described.

[1] Overview of Bending/Deformation Theories (1) Deformed State

A deformed state can be expressed as follows, according to "bending/deformation" theories (FIG. 7; primarily according to plane-strain bending deformation theories) of metal materials based on mechanics of plasticity. In this case, the relationship between true stress a and true strain c in a plastic deformation region of tensile and compression deformation of the material is expressed by the following Ludwick formula:

$$\sigma = F\epsilon^n \quad (1)$$

Here, F and n represent material constants respectively known as a plastic coefficient and a work-hardening index.

Figure 7:
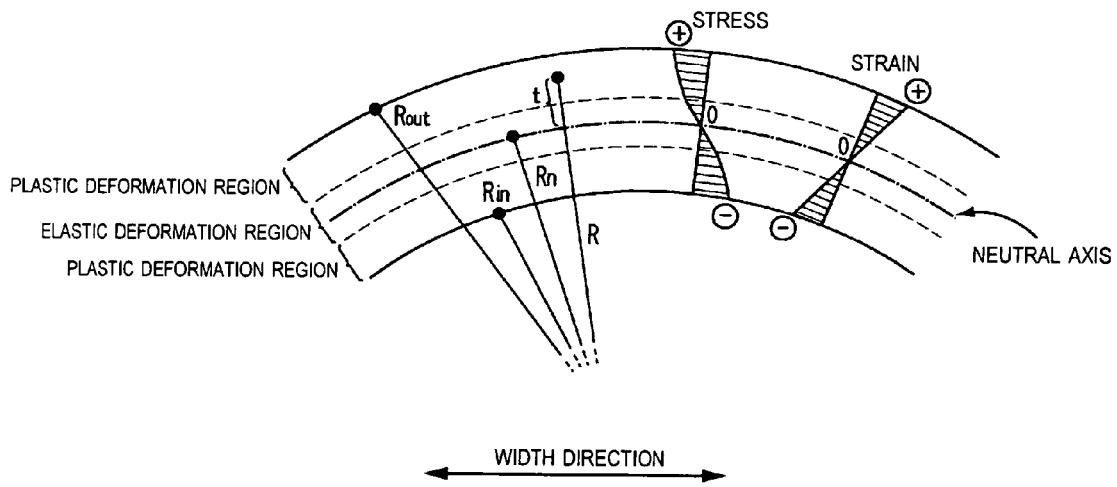
FIG. 7 is an illustration diagram for illustrating bending/deformation theories of metal material based primarily on plane-strain bending deformation theories.

Referring to FIG. 7, the stress generated in an elastic deformation region within the sheet thickness changes linearly (because of the Hooke's Law: $\sigma = E\epsilon$, where E represents a longitudinal elastic coefficient), while it increases parabolically (exponentially) in a plastic deformation region, reaching its maximum on an outer surface and an inner surface. Load P required is expressed by the following formula:

$$P = A \cdot bt^2 \sigma_u \quad (2)$$

where
A: area in the sheet thickness direction that increases by the folding back
$\sigma_u$: tensile strength
t: sheet thickness
b: sheet width.
Here, $$A = f(Ri, M) \quad (3)$$

where
Ri: each radius of curvature R in FIG. 7
M: bending moment
(f indicates that it is a function).

$$M = \frac{EI}{R_E} \quad (4)$$

where
$1/R_E$: curvature change by elastic recovery
I: geometrical moment of inertia
E: Young's modulus (longitudinal elastic coefficient).

The generated strain E is obtained from the following formula:

$$\varepsilon = \frac{R - R_n}{R_n}\left(=\frac{t}{R_n}\right) \quad (5)$$

Therefore, this strain E increases proportionally to the distance from the neutral axis (surface), and reaches its maximum on an outer surface and an inner surface. It has been found that, because of the necessity to control $\sigma_u$ in order to suppress an increase of P, it is effective to suppress work-induced transformation by employing a material that has an austenite potential $\gamma_p$ of 28 or more. Namely, it has been found that bending workability of a heat resistant austenite steel which is influenced by P and $\epsilon$ has an inflection point near $\gamma_p = 28$, and therefore the bending workability is improved rapidly in a region of $\gamma_p \geq 28$ (see FIG. 10).

(2) Springback

Figure 8:
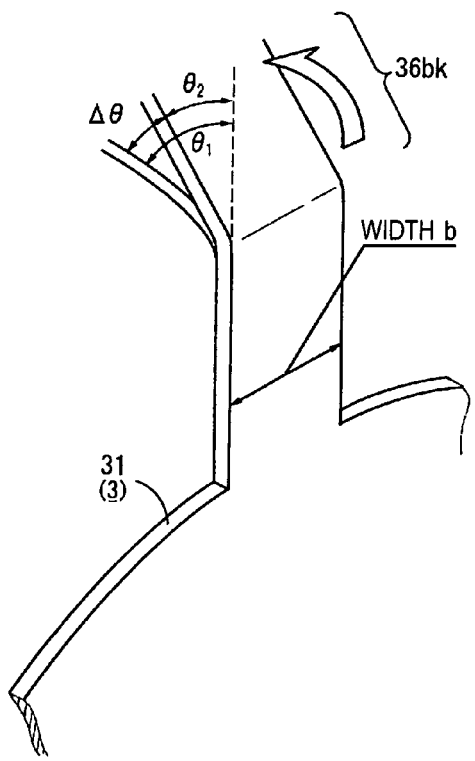
FIG. 8 is an illustration diagram defining an amount of springback $\Delta\theta$.

When the material is bent by applying a bending moment of M such that the radius of curvature is R, and when the load is removed so that this bending moment is zero, springback occurs in which the material recovers elastically so that its shape is not the same as (initial) the bent shape when the moment load was applied. The amount of this springback $\Delta\theta$ is shown, for example, in FIG. 8, and defined by the following formula:

$$\Delta\theta = \theta_1 - \theta_2 \quad (6)$$

The amount $\Delta\theta$ can be obtained as follows from the sheet thickness t, material quality, radius of curvature R, and sheet width b. First, from the mechanical point of view, $$\Delta\theta(1) = \frac{MR}{EI}\theta = C\frac{R}{EI}t^2 b \quad (C: \text{Constant}).\tag{7}$$

Or, from the viewpoint of material mechanics, $$\Delta\theta(2) = \frac{3F}{(n+2)E}\left(\frac{2R}{t}\right)^{1-n}\theta = g(v; x, t)\tag{8}$$

where
v: ASTM crystal grain size number (ASTM means "American Society for Testing and Materials")
x: other material factor
(g indicates that it is a function).

Figure 11:
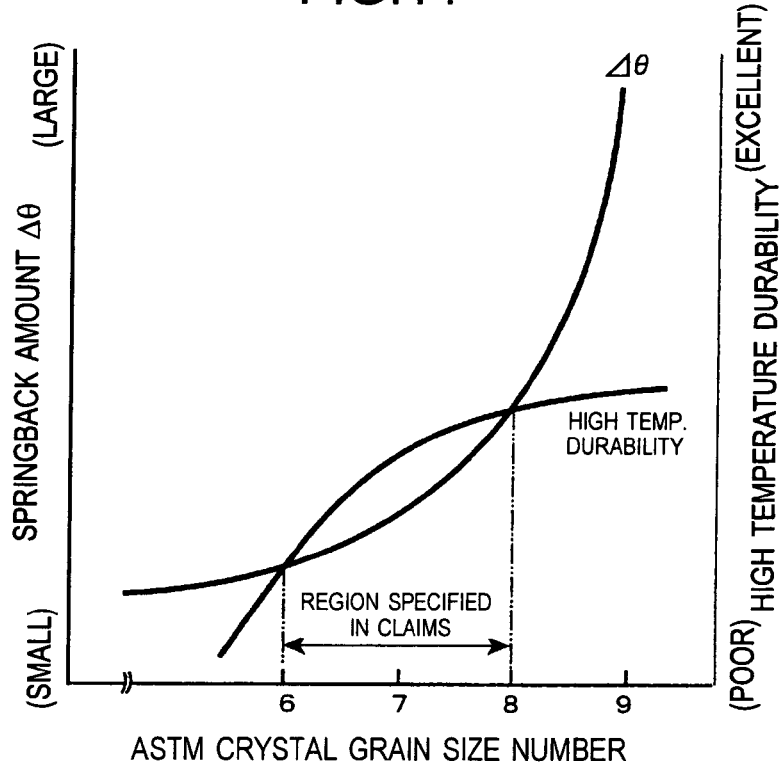
FIG. 11 is a graph showing how the amount of springback and high temperature durability change in accordance with ASTM crystal grain size number.

It has been found that, according to the latter formula, the value of v of the material independently influences the amount $\Delta\theta$, and the value of v is also relevant to surface roughness after the bending and further the high temperature durability via high temperature wear and oxidization. It has been found that, from this point of view, it is desirable to specify v as v=6.0-8.0 (see FIG. 11).

(3) Warpage and Cracks

Figure 9A:
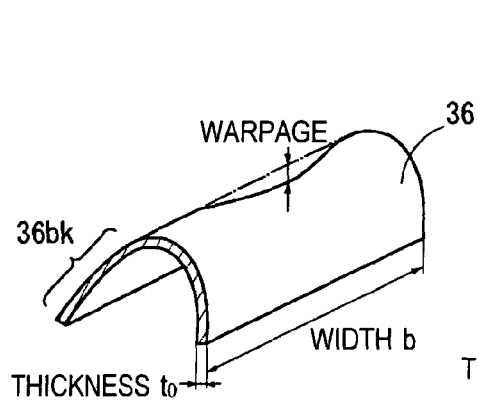
FIG. 9 is an illustration diagram showing warpage and cracks that occur in a folded-back portion.
Figure 9B:
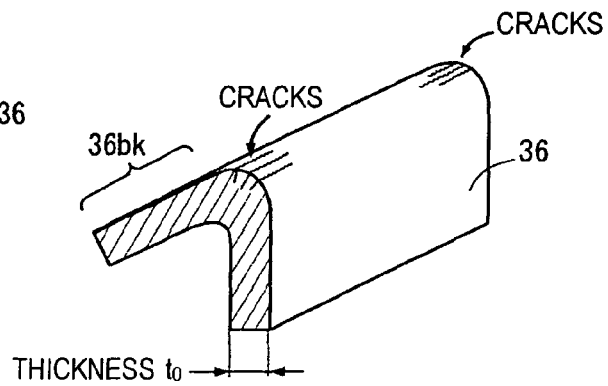

The sheet thickness in the bent portion is thinner on the outer side of the neutral axis (surface) that undergoes tensile deformation, and thicker on the inner side that undergoes compressed deformation. Therefore, with respect to the sheet width direction, the material contracts on the outer side while it stretches on the inner side. As a result, warpage (bend) occurs in the sheet width direction as shown in FIG. 9(a), taking the form of a "saddle shape". This warpage CA is expressed by the following formula, and dominated by the degree of restraint deformation in the width direction.

$$CA = const\cdot\left(\frac{b}{t}\right)^{-1}\tag{9}$$

Figure 12:
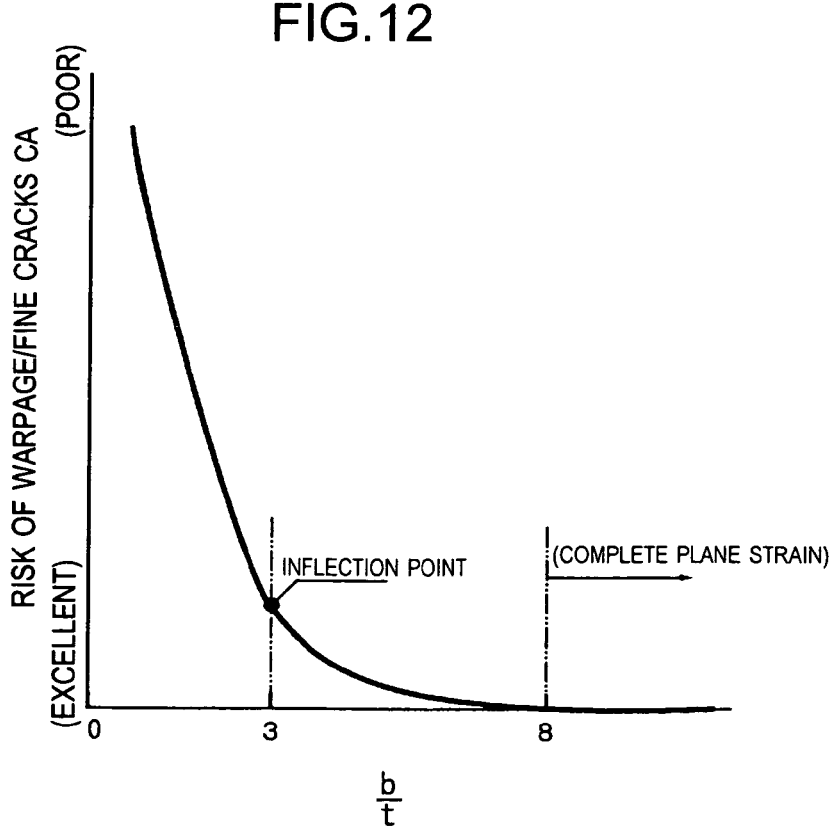
FIG. 12 is a graph showing how the risk of warpage and fine cracks changes in accordance with b/t value.

Here, if $b/t \geq 8$, deformation in the width direction is restrained so that this deformation is limited only to a portion near a sheet edge and no warpage occurs, and as well the risk of fine cracks is minimum, and the central portion of the sheet in the width direction can be considered to be in a complete plane-strained state. The risk of warpage and fine cracks is inversely proportional to b/t as shown in the formula (9). It has been confirmed that, with respect to an austenite steel satisfying the above conditions $\gamma_p \geq 28$ and v=6.0-8.0, there is an inflection point near b/t=3, and it has been ascertained that, by selecting conditions so that $b/t \geq 3.0$, warpage and fine cracks caused by the bending in accordance with the present invention can be avoided (FIG. 12).

(2) Method of Folding Back the Drive Ring and Limitations Based on the Bending Theories and Development Tests As a result of the consideration of the above-described basic mechanism and development tests of actual materials, the following findings and limiting conditions to be applied were determined with regard to the material to be used for the drive ring 31 and its processing method. With respect to the above, qualitative diagrams (FIGS. 10, 11, and 12) relating to the causes and characteristics of the bending deformation of this component will be shown from both the viewpoint of material and that of deformation.

(i) Material Type

Figure 10:
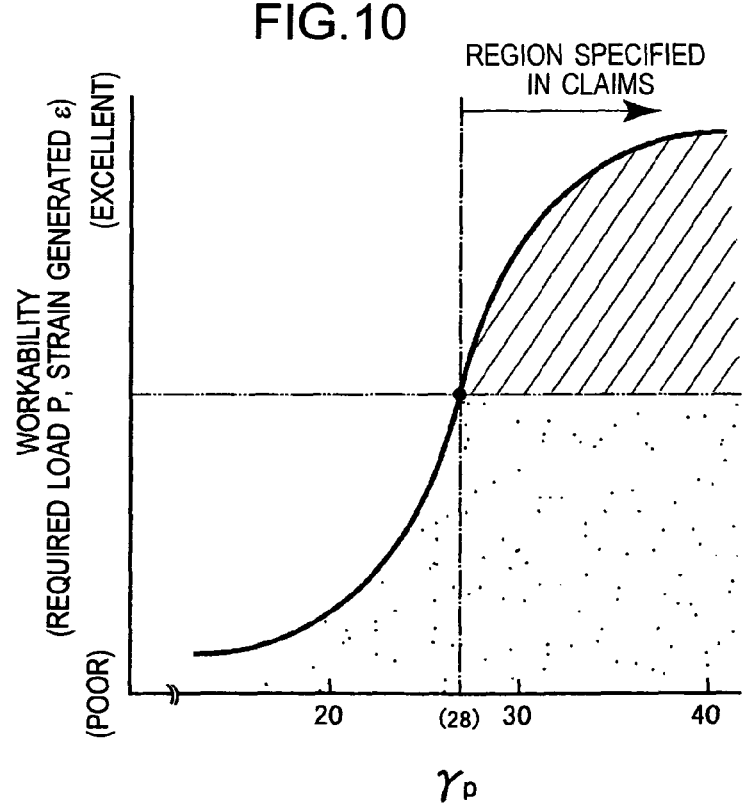
FIG. 10 is a graph showing how the workability (load required and strain generated) changes in accordance with austenite potential.

The material should be a heat resistant austenite steel having an austenite potential (Nieq) of 28 or more (FIG. 10). The reason for this is to keep the value $\sigma_u$ low so as not to make P in the above formula (2) too large, which will enable favorable bending work.

$$Nieq=24.5C+18.4N+Ni+(0.11Mn-0.0086Mn^2)+0.44Cu+0.41Co\tag{10}$$

(ii) Material Quality

In order to minimize the springback, the material should have a rough grain size between v=6.0-8.0, from $\Delta\theta=g(v; x, t)$ of the formula (8). However, if v is smaller than 6.0, then surface roughness will be further increased (and eventually the high temperature durability will be worsened).

(iii) Shape Factor

It was mentioned in the foregoing that $b/t \geq 3.0$ must be satisfied (FIG. 12) in order to avoid generation of warpage and fine cracks (cleavage) as a result of the consideration based on the formula (9). If $b/t \geq 8.0$, deformation will be in a complete plane-strained state, whereby the "concern" is completely eliminated. However, b/t can be in a range of from 3.0 to 8.0 depending on the design. It was found out that, in such a case, the control of the value v to be from 6.0 to 8.0 described under item ii), which is primarily for dealing with springback, serves for the purpose here, and further that high-temperature annealing that realizes this (although care should be taken regarding surface roughness) secures ductility of the side on which tension is applied during the bending, and at the same time, in the case of the heat resistant austenite steel, local deformability is increased by promoted formation of annealing twins, whereby a low value of b/t is compensated.

The above remarks (findings regarding the material type/material quality/shape factor) are based on an assumption that no notches 37 are formed in the drive ring 31 (blank material B). If, while adopting and implementing these selections of the material type/material quality/shape, and the like, notches 37 are further formed in the blank material B, these will provide a synergistic effect and further enhance the industrial feasibility of the folding back process of the reinforcing portion 36b, which will in turn make mass-production of the drive ring 31 extremely feasible.

(3) Reduction of High Temperature Friction and Wear By the Folding Back

Following Holm's speculation that wear in a smooth surface is an interaction between atoms, wear can be considered as a phenomenon in which some of atoms on one of two flat surfaces are trapped by the other surface, and can be stochastically defined by the number of atoms by the following formula:

$$W = z\frac{P\cdot s}{H}\tag{11}$$

Here, W represents an amount of wear, H represents hardness of the material, P represents load, s represents a friction distance, and z represents probability that atoms on one contacting surface are trapped by the other surface. However, if the side area (load area) in the sheet thickness direction of the input portion 36 in the drive ring 31, which directly receives power of the shifting drive from the actuator AC, is made m times larger ($m \geq 1$) by the folding back, then P'=P/m, s'=ms, and therefore, if the folding back is performed, the wear amount W' will be as follows:

$$W' = z\frac{P' \cdot s'}{H} = z\frac{(P/m) \cdot ms}{H} = z\frac{P \cdot s}{H} = W. \quad (12)$$

Figure 14A:
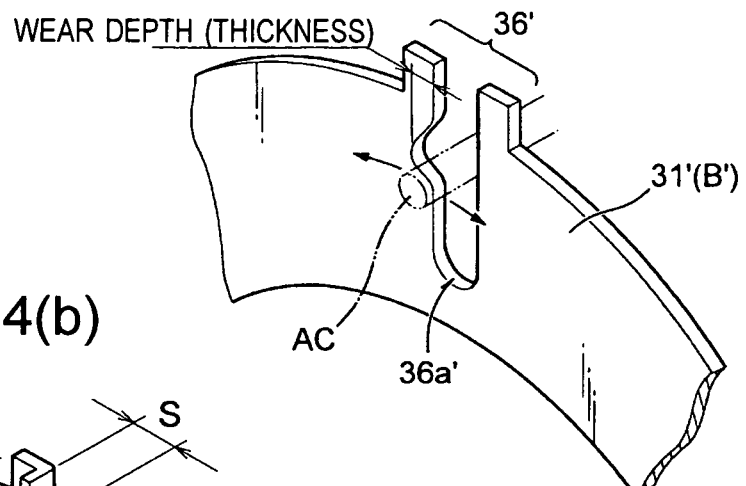
FIG. 14(a) is a perspective view showing how an input portion of a drive ring formed with a thickness of one sheet is worn after years of use.
Figure 14B:
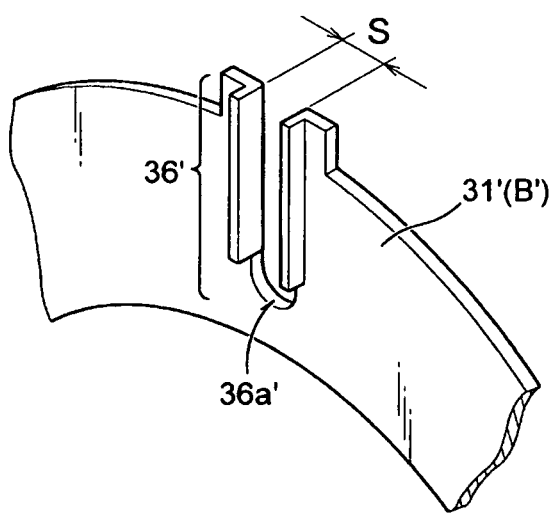
FIG. 14(b) is a perspective view of an input portion reinforced by standing up part of the drive opening.
Figure 14C:
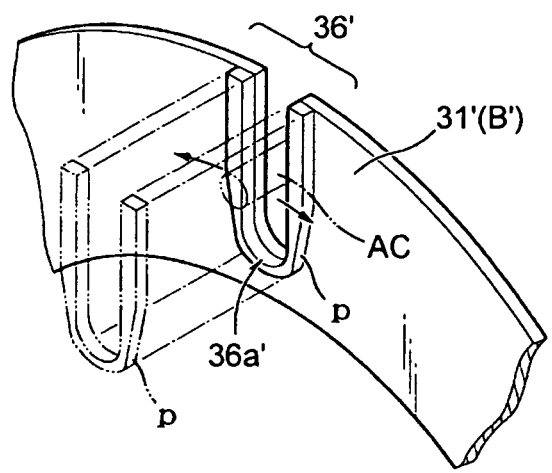
FIG. 14(c) is a perspective view of an input portion reinforced by attaching a separate member afterwards.

Therefore, while the total wear amount is equal to that of the case without any fold-backs, what is important in this case is the wear depth (wear thickness) T that is a wear-induced material loss (see FIG. 14(*a*)), when the wear area A is A'=mA, $$W(=AT)=W'(=A'T'=mAT'). \quad (13)$$

Thus, $$T' = \frac{T}{m}. \quad (14)$$

Figure 13:
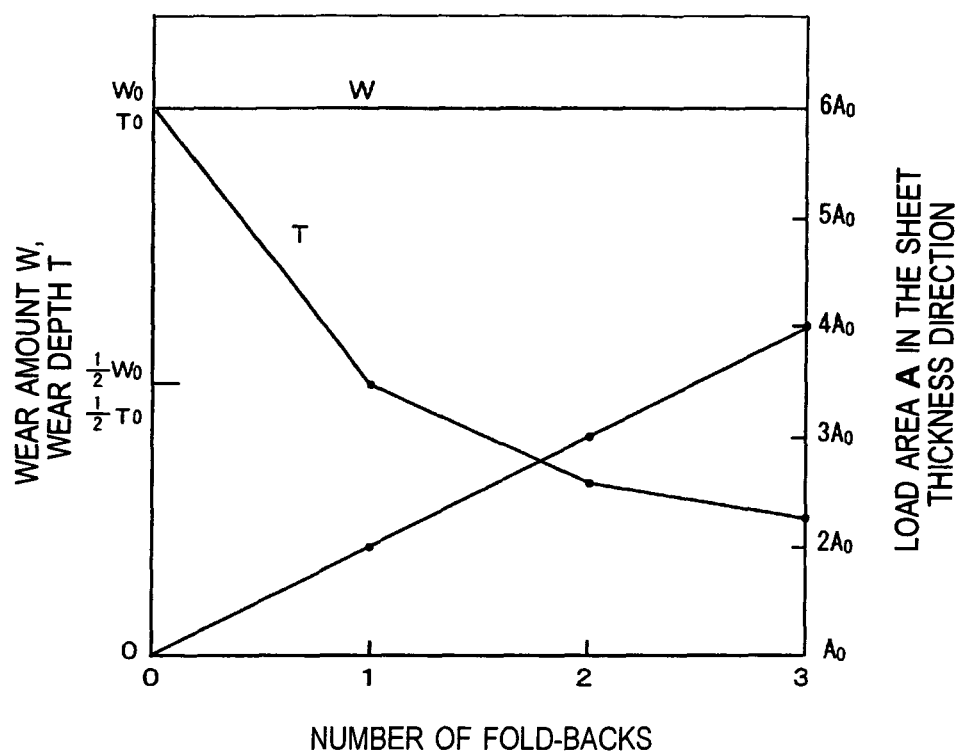
FIG. 13 is a graph showing the relationship between the number of fold-backs and load area on a side surface or between the number of fold-backs and wear amount and wear depth.

Therefore, the wear depth is reduced to 1/m, providing a positive effect with respect to high temperature durability. As the number of fold-backs (or folding back methods) increases, m increases, and hence the wear depth decreases gradually (FIG. 13).

The invention claimed is:

1. An adjustment mechanism incorporated in an exhaust guide assembly of a VGS type turbocharger, wherein
   a plurality of adjustable blades disposed at the outside of an outer circumference of an exhaust turbine wheel are rotated; and
   a relatively small amount of exhaust gas discharged from an engine is suitably throttled by the adjustable blades to increase the velocity of the exhaust gas, so as to rotate the exhaust turbine wheel using energy of the exhaust gas and to feed more air than natural intake into the engine by a compressor directly connected to the exhaust turbine wheel, thereby enabling the engine to output high power even when the engine is rotating at a low rotational speed, the adjustment mechanism in the VGS type turbocharger being characterized in that:
   when concurrently rotating the plurality of adjustable blades by said adjustment mechanism, an actuator provided outside is shift-driven to rotate a drive ring to which shaft portions of the adjustable blades are connected, thereby collectively rotating the plurality of adjustable blades; and that
   the drive ring is formed of a blank material punched out from a metal material having a substantially constant sheet thickness, a blank being cut out such that the blank includes a surplus reinforcing portion in addition to an actual product part of the drive ring, said reinforcing portion being suitably folded back so as to partially increase the thickness of an input portion of the drive ring, where power of the shifting drive is input from the actuator, thereby increasing wear resistance of the input portion.

2. The adjustment mechanism in a VGS type turbocharger according to claim 1, characterized in that the blank material of said drive ring is formed with a notch that helps the folding back of the reinforcing portion at the same time that the cutting out of the blank is performed.

3. The adjustment mechanism in a VGS type turbocharger according to claim 1, characterized in that, when forming said reinforcing portion in the blank material, said reinforcing portion is formed to extend along a radial line connecting a center of the drive ring and the input portion.

4. The adjustment mechanism in a VGS type turbocharger according to claim 1, characterized in that, for the blank material of said drive ring, a heat resistant austenite steel having an austenite potential of 28 or more and an ASTM crystal grain size number of 6.0 to 8.0 is applied, and that
   said input portion is designed to have a b/t value of 3.0 or more, where b represents a width and t represents a sheet thickness of the input portion.

5. An exhaust guide assembly of a VGS type turbocharger wherein a plurality of adjustable blades are rotatably provided at the outside of an outer circumference of an exhaust turbine wheel; and
   a relatively small amount of exhaust gas discharged from an engine is suitably throttled by the adjustable blades to increase the velocity of the exhaust gas, so as to rotate the exhaust turbine wheel using energy of the exhaust gas and to feed more air than natural intake into the engine by a compressor directly connected to the exhaust turbine wheel, thereby enabling the engine to output high power even when the engine is rotating at a low rotational speed, characterized in that the exhaust guide assembly is constituted by incorporating the adjustment mechanism according to claim 1.

* * * * *